United States Patent
Wing et al.

(10) Patent No.: US 6,322,468 B1
(45) Date of Patent: Nov. 27, 2001

(54) PRESSURE RELIEF VALVE AND DUAL PATH VENT DISC FOR HYDRAULIC TENSIONER

(75) Inventors: Braman Wing; Roger T. Simpson, both of Ithaca, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/441,126

(22) Filed: Nov. 17, 1999

(51) Int. Cl.[7] .................................. F16H 7/08; F16H 7/22
(52) U.S. Cl. ...................... 474/110; 474/135; 474/109
(58) Field of Search ...................... 474/110, 138, 474/140, 135, 109, 111, 136, 101, 113, 117, 133

(56) References Cited

U.S. PATENT DOCUMENTS

| | | |
|---|---|---|
| 4,507,103 | 3/1985 | Mittermeier . |
| 4,713,043 | 12/1987 | Biedermann . |
| 4,854,922 * | 8/1989 | Hertrich et al. ............... 474/110 |
| 4,881,927 | 11/1989 | Suzuki . |
| 5,259,820 | 11/1993 | Mott . |
| 5,346,436 | 9/1994 | Hunter et al. . |
| 5,577,970 | 11/1996 | Smith et al. . |
| 5,700,213 | 12/1997 | Simpson et al. . |
| 5,707,309 | 1/1998 | Simpson . |
| 5,718,650 | 2/1998 | Smith et al. . |
| 5,720,684 | 2/1998 | Mott . |
| 5,879,256 | 3/1999 | Tada . |
| 5,885,179 | 3/1999 | Lewis et al. . |
| 5,967,921 * | 10/1999 | Simpson et al. ............... 474/110 |
| 5,993,342 * | 11/1999 | Wigsten et al. ............ 474/111 X |
| 6,117,033 * | 9/2000 | Simpson ....................... 474/110 |
| 6,126,563 * | 9/2000 | Simpson ....................... 474/110 |

* cited by examiner

Primary Examiner—Thomas R. Hannon
Assistant Examiner—Marcus Charles
(74) Attorney, Agent, or Firm—Fitch, Even, Tabin & Flannery; Greg Dziegielewski

(57) ABSTRACT

A hydraulic tensioner having a piston slidably fitted in a bore in a housing forming a fluid chamber. The piston is biased in a protruding direction by a spring and fluid. A check valve permits flow of fluid into the fluid chamber and prevents flow of fluid in the reverse direction. A pressure relief valve is provided in the fluid chamber. The pressure relief valve works with a vent disc having two separate vent paths. The pressure relief valve and vent disc provide controlled venting of fluid from the fluid chamber during both conventional operation and during periods of excessive pressure and thus, prevent collapse of the tensioner.

20 Claims, 2 Drawing Sheets

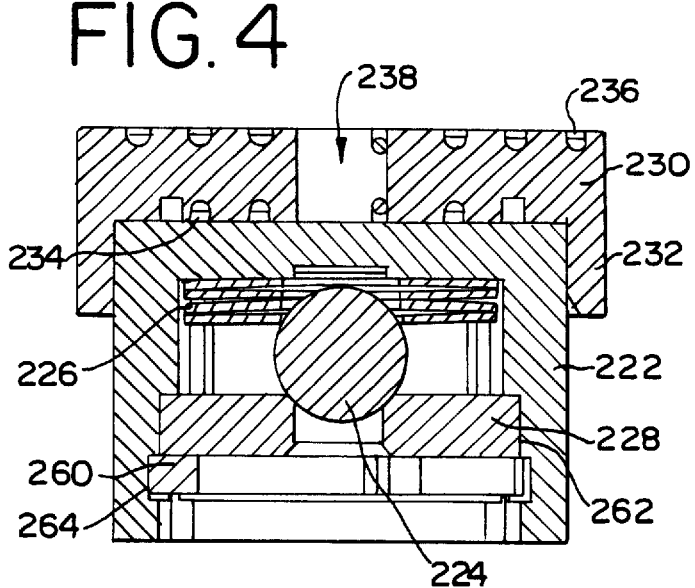
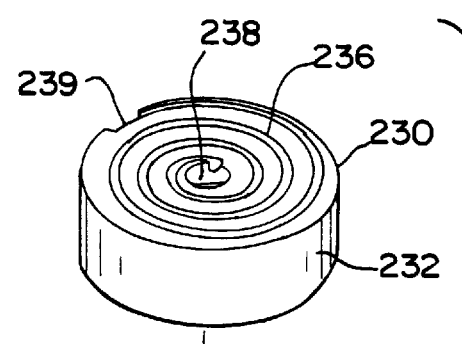
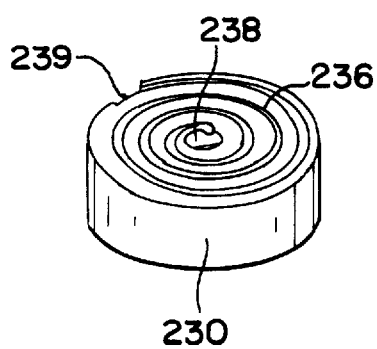
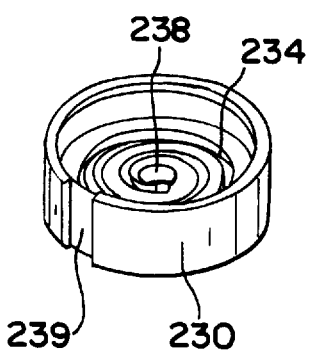
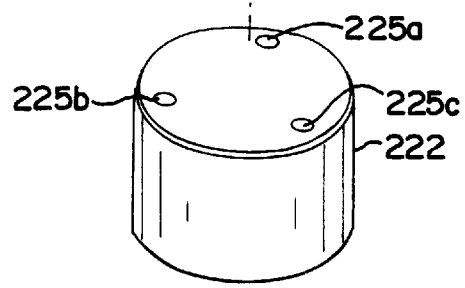
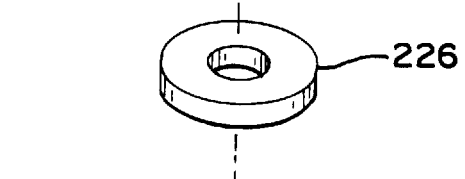
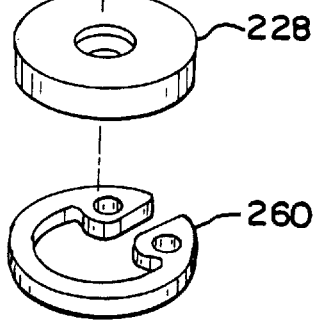

PRESSURE RELIEF VALVE AND DUAL PATH VENT DISC FOR HYDRAULIC TENSIONER

BACKGROUND OF THE INVENTION

This invention relates to hydraulic tensioners, and particularly to a hydraulic tensioner having an extending piston which is useful for constantly imparting and maintaining tension to wrapped power transmission devices such as chains, belts and the like. The invention is more particularly directed to a hydraulic tensioner having a spring and fluid actuated piston in which a self-contained pressure relief valve and vent disc is used to vent high pressure fluid from the tensioner hydraulic chamber in a controlled fashion.

Tensioning devices, such as hydraulic tensioners, are used as a control device for a power transmission chain, or any similar power transmission devices, as the chain travels between a plurality of sprockets. Generally, it is important to impart and maintain a certain degree of tension to the chain to prevent noises, slippage, or the unmeshing of teeth in cases of a toothed chain. Prevention of such slippage is especially important in the case of a chain driven camshaft in an internal combustion engine because slippage may alter the camshaft timing by several degrees, possibly rendering the engine inoperative or causing damage. In the harsh environment in which an internal combustion engine operates, chain tension can vary between excessively high or low levels as a result of the wide variations in temperature and differences between the coefficients of linear expansion among the various parts of the engine, including the chain and the tensioner. It is also necessary to provide some measures to remove excessive tensioning forces on the tight side of the chain and to insure the necessary tension forces on the slack side of the chain. Camshaft and crankshaft induced torsional vibration cause chain tension to vary considerably. This tension variation results in chain elongation. Moreover, wear of the chain components during prolonged use can cause elongation of the chain that results in a decrease in the tension of the chain.

One example of a device used to control tension in a wrapped power transmission device is described in Biedermann, U.S. Pat. No. 4,713,043. Biedermann, discloses a hydraulic ball-type check valve tensioner having a plunger, also referred to as a piston, slidably fitted into a chamber and biased by a spring in a protruding direction. The plunger extends against a lever arm that imparts tension to a chain according to the degree of slackening of the chain. A clearance, which is formed between the ball and seat of a check valve, permits the free flow of fluid therethrough into the chamber. Therefore, the hydraulic pressure from an external source, such as an oil pump or the like, flows into the chamber through passages formed in the housing, advancing the plunger easily by the combined efforts of the hydraulic pressure and the spring force.

On the other hand, when the plunger tends to move in a reverse direction, the ball is tightly contacted with the ball seat to restrict outflow of fluid from the chamber. Only a small clearance between the plunger and the housing wall permits some fluid to escape thereby allowing the piston to retract. In such a fashion, the tensioner achieves a so-called no-return function, i.e., movements are easy in one direction but difficult in the reverse direction.

However, this no-return function may present difficulties in accommodating tension spikes or surges in the chain, belt or similar wrapped power transmission devices. When a timing device operates at its resonant frequency, the chain load increases significantly. The small clearance between the plunger and the housing wall is not sufficient to quickly release the hydraulic fluid in the chamber to accommodate the sudden overload of the chain.

One example of an attempt to alleviate this problem in a hydraulic tensioner is described in Suzuki, U.S. Pat. No. 4,881,927. Suzuki discloses a hydraulic tensioner having a piston slidably fitted into a chamber and biased by a spring in a protruding direction. This tensioner includes a relief valve having a sleeve slidably fitted in an auxiliary chamber in communication with the first chamber, with a spring biasing the sleeve into a depressed position to block a discharge port. Oil in the first chamber flows into the auxiliary chamber to force the sleeve against the biasing spring action to unblock the discharge port.

Unfortunately, this relief valve may be slow to open and close due to high mass and subject to variable friction between the sleeve and auxiliary chamber wall. This may vary the pressure at which the relief valve operates. As well, because the flow area is proportional to the pressure in the chamber, extreme pressure spikes may cause too much fluid to flow out of the chamber resulting in too little pressure in the chamber to maintain proper chain tension after the external cause of the pressure spike recovers. Too little pressure in the chamber may result in tensioner collapse and loss of proper chain tension.

Another example of an attempt to provide a hydraulic tensioner with a relief valve is described in Mittermeier, U.S. Pat. No. 4,507,103. Mittermeier discloses a hydraulic ball-type check valve tensioner having a piston slidably fitted into a chamber and biased by a spring in a protruding direction. This tensioner includes a relief valve in a bore at the protruding end of the piston. This relief valve is a spring-biased ball type valve with the spring set against a treaded throttle plug capping the bore. Oil in the first chamber forces open that ball, upon reaching a set high pressure, and flows into the bore, past the throttle plug threads to the atmosphere. Unfortunately, this relief valve may be slow to release large displacements of oil because of the restricted path past the threads and resultant back-pressure build against the ball.

Accordingly, it is an object of the present invention to provide a hydraulic tensioner for chain, belt or similar wrapped power transmission devices which maintains a substantially constant tensioning force.

It is another object of the invention to provide a hydraulic tensioner with a pressure relief mechanism to allow the piston to return when excessive loads are seen by the chain.

It is another object of the present invention to provide a hydraulic tensioner with a pressure relief valve that has an even spring rate, low mass and a high natural frequency.

It is another object of the present invention to provide a hydraulic tensioner with a pressure relief valve with a low response time and a controlled flow through.

SUMMARY OF THE INVENTION

The above objects are achieved by providing a hydraulic tensioner with a low mass self-contained pressure relief valve and a dual path vent disc which are used together in a conventional hydraulic tensioner. The dual path vent disc has a pair of tortuous vent paths in parallel operation; one vent path controls conventional venting of fluid from the fluid chamber and the other vent path controls venting of fluid from the compact pressure relief valve.

According to one aspect of the present invention, there is provided a tensioner for a wrapped power transmission device, e.g. a chain linking at least two rotating members such as a pair of sprockets. A hollow, cylindrical piston, internally provided with a fluid chamber, slidably fits with a bore formed within a tensioner housing. A piston spring is provided to bias the piston in a protruding direction from the housing and toward the chain. The present invention is directed to a hydraulic tensioner having pressure relief and fluid control mechanisms. The fluid is typically oil, which may include some air.

The hydraulic tensioner of the present invention includes a compact, self-contained pressure relief valve preferably operating in combination with a vent disc. The relief valve and vent disc are located in the fluid chamber adjacent the upper end of the piston.

During operation of the hydraulic tensioner the pressure relief valve and vent disc provide a mechanism for conventional venting of fluid and air from the fluid chamber and additional venting capacity during periods of extreme high fluid pressure. Furthermore, the present invention includes a mechanism to prevent collapse of the tensioner during periods of extreme high pressure fluid venting by controlling release of fluid by the relief valve.

In one embodiment, the pressure relief valve includes a generally cylindrical valve body adapted to reside in the upper end of the piston. The pressure relief body has an inverted cup shape. The pressure relief valve includes a ring-shaped valve seat. The valve seat is essentially a flattened ring held in place by a circlip. The circlip is located and held in the valve body in an interior groove formed in the inside lower skirt portion of the valve body. The valve seat has a central opening to permit fluid to pass through the interior of the valve body.

A ball-shaped valve member is located inside the valve body and biases the ball against the opening of the valve seat with a stack of belleville washers. During a period of high pressure, and the pressure in the fluid chamber exceeds a predetermined maximum, the ball is forced away from the valve seat. Fluid passing by the ball is allowed to exit the pressure relief valve through an oil exit passage formed in the top of the valve body.

Use of belleville springs as spring members allows for a more compact design than a helical spring and also is much lighter, making the natural frequency of the system higher. In addition, it is possible to design and obtain a belleville washer to provide a nearly constant load over a large portion of its travel. This allows a much looser manufacturing tolerance while still tightly controlling the activation or pop-off pressure of the valve.

In another embodiment of the present invention the valve member is a conical steel disk provided in place of the ball and held against the valve seat by a similar stack of belleville washers. The disk is lighter than the ball, further lowering the mass and increasing the natural frequency of the system. This design has the advantage of being more compact than the previous one.

The present invention preferably includes a vent disc with a pair of tortuous oil paths molded therein. The vent disc is located in the fluid chamber at the exit end of the relief valve. The vent disc is in fluid communication with both the fluid chamber and the pressure relief valve. One oil path in the vent disc allows the tensioner to vent fluid conventionally from the fluid chamber during normal operation of the tensioner. The other path in the vent disc controls the flow of fluid exiting the oil exit passage of the pressure relief valve. Fluid from both paths is released into the exhaust vent of the hydraulic tensioner.

In operation, as the pressure in the fluid chamber increases, air in the chamber is forced through a groove formed in the sidewall or skirt of the vent disc and through a tortuous vent path in the top surface of the vent disc. The tortuous vent path directs the air and some fluid to the exhaust vent formed at the upper end of the tensioner piston. At a predetermined maximum pressure level, the fluid forces the pressure relief valve member from the valve seat. Fluid flows past the ball or disc and exits by way of the valve fluid passage or oil exit passage. From the oil exit passage fluid flows into and through another tortuous passage formed in the bottom surface of the vent disc and is directed into the exhaust vent of the piston.

The advantages and features of the chain tensioner apparatus of the present invention will be better understood by reference to the embodiments which are hereafter presented and depicted by way of example in the following description taken in conjunction with the accompanying drawings in which like reference numbers are used to indicate like elements.

BRIEF DESCRIPTION OF THE DRAWINGS

FIG. 4 is a cross-sectional view of a third embodiment of the present invention.

FIG. 5 is a perspective view of the vent disc of the present invention showing the top surface.

FIG. 6 is a perspective view of the vent disc shown in FIG. 5 depicting the bottom surface and the groove formed in the side skirt of the vent disc.

FIG. 7 is an exploded view of the pressure relief valve and vent disc depicted in FIG. 4.

DETAILED DESCRIPTION OF THE PREFERRED EMBODIMENTS

Figure 1:
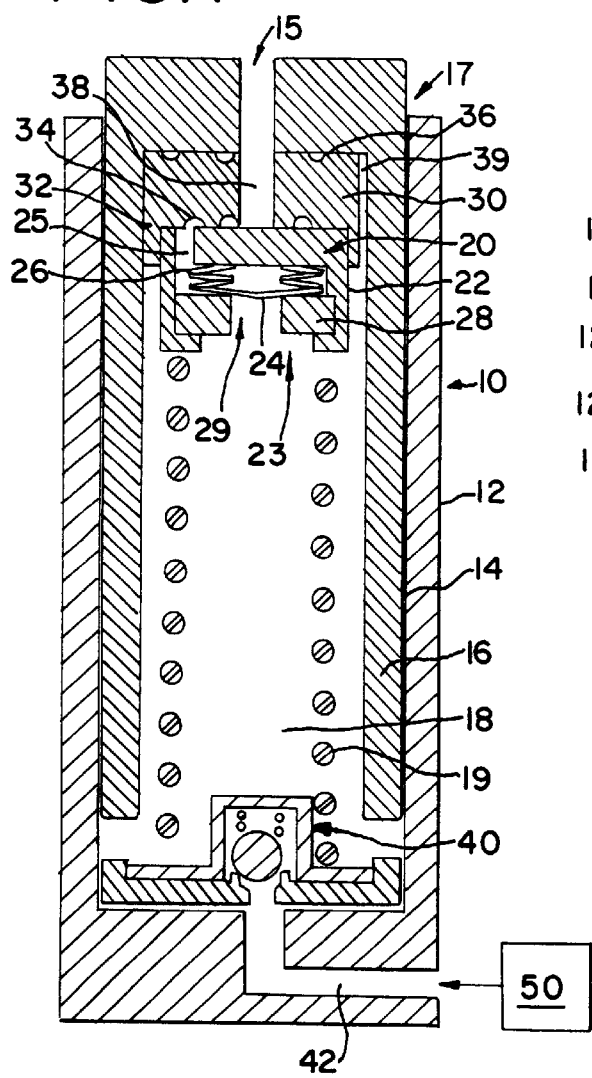
FIG. 1 is a cross-sectional view of a first embodiment of the pressure relief valve and vent disc of the present invention depicted in a generalized hydraulic tensioner.

Turning now to the drawings, FIG. 1 illustrates a generalized hydraulic tensioner 10 incorporating the pressure relief valve 20 and dual path vent disc 30 of the present invention. It should be understood that any hydraulic tensioner of the general type shown may benefit from the present invention. The hydraulic tensioner 10 includes a tensioner housing or tensioner body 12 with a bore 14. A hollow piston 16 is slidably fitted into the bore 14 of the tensioner housing 12 forming a fluid chamber 18 therebetween. A spring 19 positioned in the fluid chamber 18 between the housing 12 and the piston 16 is provided to bias the piston in a protruding direction from the bore. A check valve 40 is provided between the housing inlet passageway 42 and the fluid chamber 18 to permit fluid to flow into the fluid chamber and prevent flow in the reverse direction.

The pressure relief valve 20 and dual path vent disc 30 are located in the fluid chamber 18 adjacent the upper end 17 of the piston 16. The upper end 17 of the piston is the end nearest the protruding portion of the piston which extends outwardly from the tensioner bore 14 and includes the exhaust vent port 15. The pressure relief valve 20 includes a generally hollow cylindrical valve body 22. Located within the valve body 22 are a valve member 24 and a stack of belleville springs 26 biasing the valve member 24 in the closed position against the valve seat 28. In this first embodiment, the valve member 24 is a conical metal disc. The valve seat 28 is in the form of a flat ring with a central opening 29. When pressure in the fluid chamber 18 exceeds a specified maximum, typically on the order of 200 to 300 pounds per square inch, the valve member 24 becomes unseated. Oil then flows from the fluid chamber through the relief valve 20 through the lower opening 23 in the valve body and past the valve seat 28. An oil passage 25 in the top of the valve body allows the oil to exit the relief valve body and directs the oil to the vent disc 30.

The vent disc 30 is located atop the relief valve 20 adjacent to and in contact with the upper end 17 of the piston 16. The outside diameter of the vent disc 30 is sized to provide a sealed fit with the internal diameter of the inside of the piston to prevent significant or uncontrolled loss of fluid between the inner piston wall and the outside of the vent disc. The vent disc is held in place by the fit with the inside of the piston. Also, pressure from the spring 19 acts to keep the relief valve in contact with the bottom of the vent disc and the vent disc pressed against the upper inside bore of the piston.

The pressure relief valve body 20 nests in the bottom of the vent disc 30 and is held in place by a circular sidewall portion 32 depending from the vent disc 30. Oil exiting the oil exit passage 25 of the valve body is directed to the first spiral groove 34, which is referred to as a tortuous path, formed in the bottom surface of the vent disc. The oil follows the groove 34 which spirals inwardly and exits a central vent disc bore 38. The oil from the central vent disc bore 38 is free to exit the tensioner via the piston exhaust vent port 15. The tortuous vent path 34 provides a predetermined amount of resistance to exiting oil traveling therethrough and thus prevents rapid or uncontrolled pressure loss and collapse of the tensioner.

In addition to the vent path 34 controlling fluid release from the pressure relief valve 20, the vent disc 30 has a second groove or vent path 36 to control conventional venting from the fluid chamber 18. Fluid and air in the fluid chamber 18 may exit the tensioner 10 bypassing the pressure relief valve 20 by traveling through the groove 39 formed in the sidewall portion 32 of the vent disc 30. The groove 39 connects the fluid chamber 18 and the second tortuous path 36 which is located in the top surface of the vent disc. Oil flows through the groove 39 and the second vent path 36 and exits the vent disc 30 by way of the vent disc bore 38.

Figure 2:
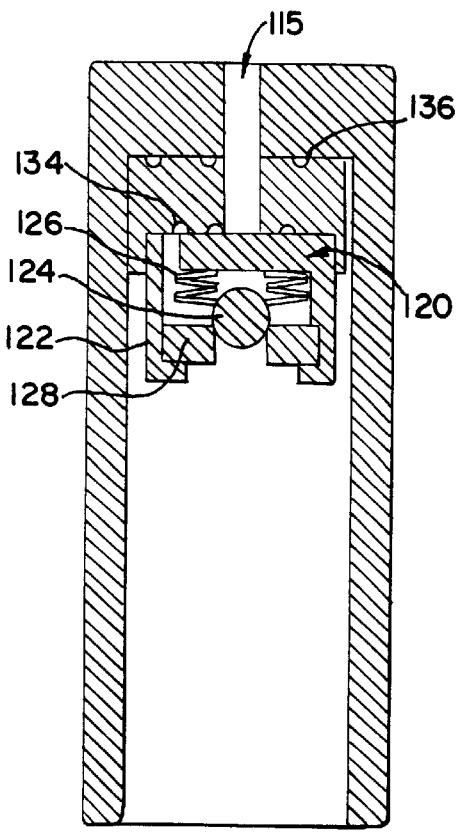
FIG. 2 is a cross-sectional view of a second embodiment of the pressure relief valve and vent disc of the present invention.

As shown in FIG. 2, the pressure relief valve 120 of another embodiment of the present invention includes a generally cylindrical hollow valve body 122. Inside the valve body are a plurality of stacked belleville washers 126 operating to bias a ball 124 against a valve seat 128. This embodiment operates in a manner similar to the embodiment shown in FIG. 1. However, the ball-shaped valve member 126 has greater mass, and thus, has a slower response time and lower natural frequency than a thin metal disc or even a hollow metal ball. The exact configuration will depend on the dynamic response designed for the intended service. The valve member may be constructed from any suitable metal, or ceramic or engineered plastics, such as polyamide.

Figure 3:
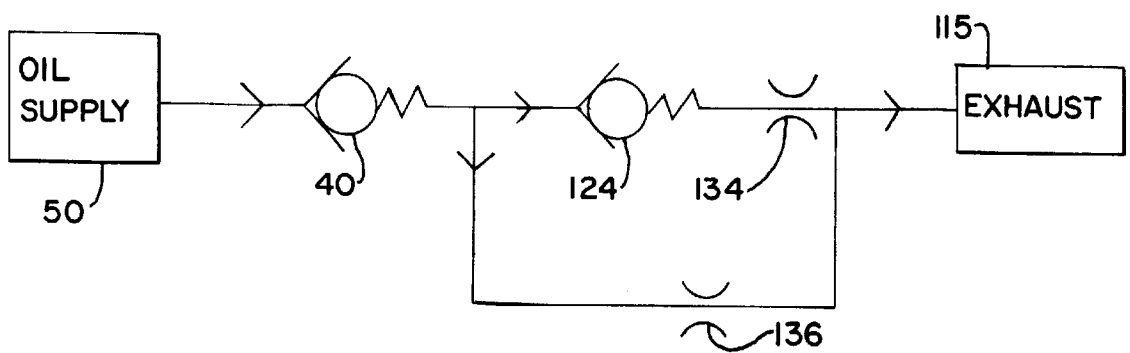
FIG. 3 is a flow chart depicting the dual fluid flow paths in parallel relationship.

FIG. 3 symbolically illustrates the dual path function of the present invention. Fluid from a pressurized oil supply 50 enters the fluid chamber through the check valve 40. Venting of oil during a pressure relieving condition is accomplished when fluid opens and passes through the pressure relief valve and exits through the first tortuous vent path 134 and exhaust vent 115. Conventional venting of trapped air and some fluid is accomplished by the second route through the second tortuous path 136 and exhaust vent 115.

As shown in FIG. 4, in a preferred embodiment the valve seat 228 is located in a groove 262 formed in the inside of the valve body 222. The valve seat 228 is held in place by a flat circlip 260 located in a separate lower groove 264 in the valve body 222. A passageway or a plurality of passageways (shown in FIG. 7) formed through the top of the valve body 222 allows oil to exit the pressure relief valve.

The vent disc (also shown in FIGS. 5 and 6 in top and bottom perspective views) is located atop the relief valve body 222 adjacent to and in contact with the top of the valve body 222. A downward extending sidewall or skirt portion 232 of the vent disc 230 receives the top portion of the valve body 222. A groove 239 formed in the sidewall or skirt portion 232 of the vent disc allows fluid from the fluid chamber to bypass the relief valve. Fluid travels through the sidewall groove 239 in the vent disc and is directed to a second tortuous vent path 236 in the shape of a inwardly spiraling groove in the top surface of the vent disc. A central bore 238 leads fluid from the second vent path 236 and leads to the exhaust vent formed in the upper end of the piston. The fluid exits the tensioner through the exhaust vent.

FIGS. 5 and 6 illustrate the vent disc in more detail. The second vent path 236 is shown clearly in FIG. 5 on top of the vent disc 230. The second vent path 236 leads oil from the sidewall groove 239 at the edge of the vent disc to the central bore 238 of the vent disc. FIG. 6 shows the first vent path 234 formed on the underside of the vent disc 230. The first vent path 234 leads oil from the pressure relief valve to the central bore 238 of the vent disc. Oil in the central bore 238 is vented from the tensioner through the exhaust vent.

FIG. 7 is an exploded illustration of the pressure relief valve and vent disc shown in FIG. 4. The pressure relief valve includes a generally cylindrical body 222. A stack of belleville washers 226 bias a spherical valve member 224 against a disc-shaped valve seat 228. A circlip 260 holds the valve seat in the valve body. Exit passages 225a, 225b, 225c formed at the top of the body allow fluid to exit the relief valve. A vent disc 230 fits over the top of the valve body 222. A first vent path (not shown) formed in the underside of the vent disc 230 controls the release of fluid from the exit passages 225a, 225b, 225c and delivers the fluid to the central bore 238.

A groove 239 formed in the sidewall is in communication with the second tortuous vent path 236 formed on the top surface of the vent disc. A bore 238 is formed in the center of the vent disc 230 in communication with both vent paths permitting venting of fluid from the tensioner.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention, is therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner for a chain extending between two rotating members, comprising:

a tensioner housing having an open bore, a piston having an open lower end and a closed upper end, said piston lower end slidably positioned within said bore and forming a fluid chamber therebetween, said fluid chamber communicating with an external source of pressurized fluid, said piston upper end having an exhaust vent formed therein to permit air and fluid to escape said fluid chamber, a piston spring member biasing said piston in a direction extending from said housing, a check valve positioned to allow the transfer of fluid from said source of pressurized fluid to said chamber and to block return of fluid from said chamber, a pressure relief valve, said pressure relief valve including a valve body positioned in said fluid chamber, said pressure relief valve body including an opening in communication with said fluid chamber, a valve member biased against said opening by a valve spring member, said pressure relief valve member and said valve spring member being adapted under specified maximum pressure conditions within said fluid chamber to permit passage of fluid from said opening through a fluid exit passage and to said exhaust vent, a vent disc adjacent said upper end of said piston between said pressure relief valve and said exhaust vent, said vent disc having a first tortuous vent path in communication with said fluid exit passage and said exhaust vent to permit controlled fluid exit from said pressure relief valve to said exhaust vent, said vent disc having a second tortuous path in communication with said fluid chamber and said exhaust vent to permit controlled fluid exit from said chamber to said exhaust vent.

2. The hydraulic tensioner of claim 1, wherein said spring member of said pressure relief valve is a plurality of belleville springs.

3. The hydraulic tensioner of claim 2, wherein said valve member is a vent disc.

4. The hydraulic tensioner of claim 2, wherein said valve member is a ball.

5. The hydraulic tensioner of claim 2, wherein said pressure relief valve includes:

a valve seat disposed within said valve body, said valve member being biased against said valve seat.

6. The hydraulic tensioner of claim 5, wherein said valve member is a vent disc.

7. The hydraulic tensioner of claim 5, wherein said valve member is a ball.

8. A hydraulic tensioner for a chain extending between two rotating members, comprising:

a tensioner housing having an open bore, a piston having an open lower end and a closed upper end, said piston lower end slidably positioned within said bore and forming a fluid chamber therebetween, said fluid chamber communicating with an external source of pressurized fluid, said piston upper end having an exhaust vent formed therein to permit air and fluid to escape said fluid chamber, a piston spring member biasing said piston in a direction extending from said housing, a check valve positioned to allow the transfer of fluid from said source of pressurized fluid to said chamber and to block return of fluid from said chamber, a pressure relief valve, said pressure relief valve including a valve body positioned in said fluid chamber, said pressure relief valve body including valve seat held in place in said valve body by a circlip, said valve seat having an opening in communication with said fluid chamber, a valve member biased against said valve seat by a plurality of belleville springs, said pressure relief valve member and said plurality of belleville springs being adapted under specified maximum pressure conditions to permit passage of fluid from said opening through a fluid exit passage and to said exhaust vent, a vent disc adjacent said upper end of said piston between said pressure relief valve and said exhaust vent, said vent disc having a first tortuous vent path in communication with said fluid exit passage and said exhaust vent to permit controlled fluid exit from said pressure relief valve to said exhaust vent, said vent disc having a second tortuous path in communication with said fluid chamber and said exhaust vent to permit controlled fluid exit from said chamber to said exhaust vent.

9. A hydraulic tensioner for a chain extending between two rotating members, comprising:

a housing having a bore, a piston having an open lower end and a closed upper end, said piston lower end slidably positioned within said bore forming a fluid chamber therewith, said fluid chamber communicating with an external source of pressurized fluid, said piston biased in a direction extending from said bore, said piston upper end having at least one exhaust vent formed therein to permit the flow of air and fluid from said chamber, a first vent passage in communication with said exhaust vent and said chamber, said first vent passage allowing the controlled flow of air and fluid from said chamber when a first predetermined pressure within said chamber is exceeded;

a second vent passage in communication with said exhaust vent and said chamber, said second vent passage permitting fluid flow from said chamber to said exhaust vent to relieve pressure from said chamber; and a pressure relief valve having a closed position preventing the flow of fluid through said second vent passage and an open position permitting the flow of air and fluid through said second vent passage when a second predetermined pressure within said chamber is exceeded.

10. The hydraulic tensioner of claim 9, wherein a piston spring member biases said piston in a direction extending from said bore.

11. The hydraulic tensioner of claim 9, wherein a check valve is positioned to allow the transfer of fluid from said external source of pressurized fluid to said chamber and to block the return of fluid from said chamber.

12. A. The hydraulic tensioner of claim 9, wherein said pressure relief valve comprises a valve body positioned in said chamber, said pressure relief valve body comprising an opening in communication with said chamber, a valve member biased against said opening by a valve spring member, said valve member and said valve spring member being adapted under specified maximum pressure conditions within said chamber to permit passage of fluid from said opening through said second vent passage to said exhaust vent.

13. The hydraulic tensioner of claim 9, wherein a vent disc is positioned adjacent said upper end of said piston between said pressure relief valve and said exhaust vent, said first vent passage comprising a first tortuous vent path formed in said vent disc.

14. The hydraulic tensioner of claim 9, wherein a vent disc is positioned adjacent said upper end of said piston between said pressure relief valve and said exhaust vent, said second vent passage comprising a second tortuous vent path formed in said vent disc.

15. The hydraulic tensioner of claim 12, wherein said spring member of said pressure relief valve comprises a plurality of belleville springs.

16. The hydraulic tensioner of claim 12, wherein said valve member is a vent disc.

17. The hydraulic tensioner of claim 12, wherein said valve member comprises a ball.

18. The hydraulic tensioner of claim 12, wherein said pressure relief valve comprises a valve seat disposed within said valve body, said valve member being biased against said valve seat.

19. The hydraulic tensioner of claim 13, wherein said second vent passage comprises a second tortuous path formed in said vent disc.

20. The hydraulic tensioner of claim 18, wherein said valve seat is held in place in said valve body by a circlip.

* * * * *